US012579993B2

(12) United States Patent
Togami et al.

(10) Patent No.: US 12,579,993 B2
(45) Date of Patent: Mar. 17, 2026

(54) MULTI-TALKER AUDIO STREAM SEPARATION, TRANSCRIPTION AND DIARAIZATION

(71) Applicant: Amazon Technologies, Inc., Seattle, WA (US)

(72) Inventors: Masahito Togami, San Jose, CA (US); Ritwik Giri, Mountain View, CA (US); Michael Mark Goodwin, Scotts Valley, CA (US); Arvindh Krishnaswamy, Palo Alto, CA (US); Siddhartha Shankara Rao, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 319 days.

(21) Appl. No.: 17/850,617

(22) Filed: Jun. 27, 2022

(65) Prior Publication Data

US 2024/0096346 A1     Mar. 21, 2024

(51) Int. Cl.
*G10L 15/26* (2006.01)
*G10L 15/04* (2013.01)
*G10L 21/0208* (2013.01)
*G10L 21/10* (2013.01)

(52) U.S. Cl.
CPC .............. *G10L 21/10* (2013.01); *G10L 15/04* (2013.01); *G10L 15/26* (2013.01); *G10L 21/0208* (2013.01)

(58) Field of Classification Search
CPC ................................ G10L 15/26; G10L 21/10
See application file for complete search history.

(56) References Cited

U.S. PATENT DOCUMENTS

| | | | |
|---|---|---|---|
| 9,706,136 B2 | 7/2017 | Lee et al. | |
| 11,356,488 B2 | 6/2022 | Mackell et al. | |
| 2014/0074467 A1 | 3/2014 | Ziv et al. | |
| 2019/0066713 A1* | 2/2019 | Mesgarani | ............. G10L 25/30 |

(Continued)

FOREIGN PATENT DOCUMENTS

| WO | WO 2011/022194 A2 | 2/2011 |
|---|---|---|
| WO | WO 2016/025951 A1 | 2/2016 |

OTHER PUBLICATIONS

Paturi, R., Srinivasan, S., Kirchhoff, K., & Garcia-Romero, D. (2021). Directed speech separation for automatic speech recognition of long form conversational speech. arXiv preprint arXiv:2112.05863.*

(Continued)

*Primary Examiner* — Bryan S Blankenagel
(74) *Attorney, Agent, or Firm* — BakerHostetler

(57)     ABSTRACT
A plurality of talker embedding vectors may be derived that correspond to a plurality of talkers in an input audio stream. Each talker embedding vector may represent respective voice characteristics of a respective talker. The talker embedding vectors may be generated based on, for example, a pre-enrollment process or a cluster-based embedding vector derivation process. A plurality of instances of a personalized noise suppression model may be executed on the input audio stream. Each instance of the personalized noise suppression model may employ a respective talker embedding vector. A plurality of single-talker audio streams may be generated by the plurality of instances of the personalized noise suppression model. A plurality of single-talker transcriptions may be generated based on the plurality of single-talker audio streams. The plurality of single-talker transcriptions may be merged into a multi-talker output transcription.

16 Claims, 9 Drawing Sheets

(56)     References Cited

U.S. PATENT DOCUMENTS

| | | | |
|---|---|---|---|
| 2019/0215464 A1 | 7/2019 | Kumar | |
| 2020/0043471 A1* | 2/2020 | Ma | G10L 15/07 |
| 2020/0211571 A1* | 7/2020 | Shoa | G10L 17/22 |
| 2021/0026517 A1 | 1/2021 | Yang et al. | |
| 2021/0160242 A1* | 5/2021 | McKnight | H04L 63/102 |
| 2022/0237735 A1 | 7/2022 | Zingade et al. | |
| 2022/0261218 A1* | 8/2022 | Shin | G06F 3/165 |
| 2022/0335953 A1* | 10/2022 | Rikhye | G10L 17/06 |
| 2022/0375492 A1* | 11/2022 | Grangier | G10L 15/063 |
| 2023/0087477 A1* | 3/2023 | Choi | G10L 25/93 |
| | | | 704/200 |
| 2023/0169981 A1 | 6/2023 | Kim et al. | |
| 2023/0231971 A1 | 7/2023 | Davidson | |
| 2024/0013774 A1* | 1/2024 | Zhang | G10L 17/18 |
| 2024/0160849 A1* | 5/2024 | Fanelli | G10L 17/18 |

OTHER PUBLICATIONS

International Patent Application No. PCT/US2023/026156; Int'l Search Report and the Written Opinion; dated Sep. 12, 2023; 14 pages.

Paturi et al.; "Directed Speech Separation for Automatic Speech Recognition of Long Form Conversational Speech"; Interspeech; 2022; 5 pages.

Denisov et al.; "End-to-End Multi-Speaker Speech Recognition using Speaker Embeddings and Transfer Learning"; Interspeech; arXiv:1908.04737; 2019; 5 pages.

Paturi et al.; "Directed Speech Separation for Automatic Speech Recognition of Long Form Conversational Speech"; arXiv:2112.05863; Dec. 10, 2021; 5 pages.

Giri et al.; "Personalized PercepNet: Real-time, Low-complexity Target Voice Separation and Enhancement"; Interspeech; Aug.-Sep. 2021; p. 1124-1128 (Note—this document is also available from arxiv (https://arxiv.org/abs/2106.04129) with an indicated Jun. 8, 2021 "submission" date).

Giri et al.; "Personalized PercepNet: Real-time, Low-complexity Target Voice Separation and Enhancement"; arXiv:2106.04129; Jun. 8, 2021; 5 pages.

International Patent Application No. PCT/US2023/026156; Int'l Preliminary Report on Patentability; dated Jan. 9, 2025; 7 pages.

\* cited by examiner

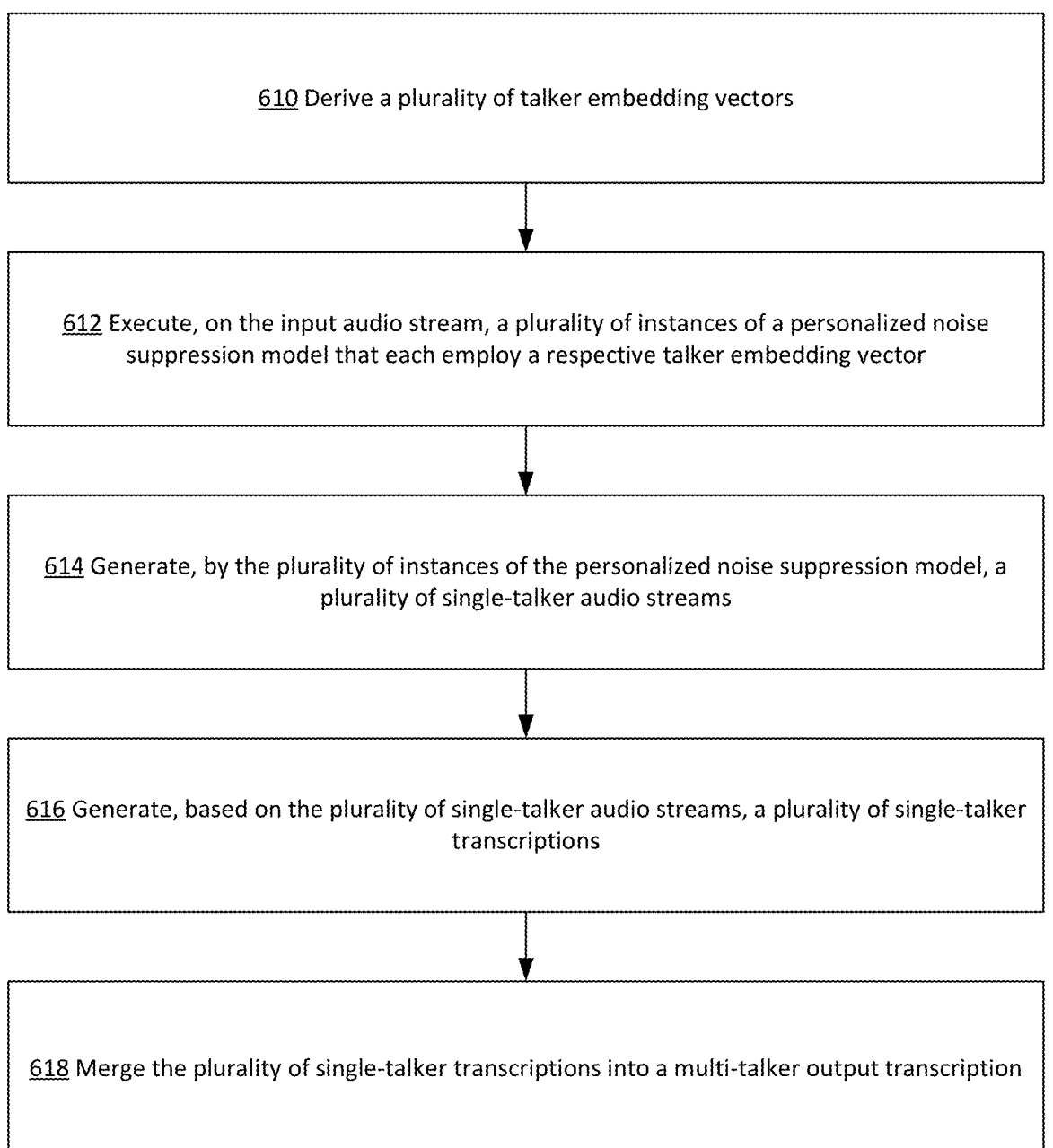

<u>610</u> Derive a plurality of talker embedding vectors

<u>612</u> Execute, on the input audio stream, a plurality of instances of a personalized noise suppression model that each employ a respective talker embedding vector <u>614</u> Generate, by the plurality of instances of the personalized noise suppression model, a plurality of single-talker audio streams <u>616</u> Generate, based on the plurality of single-talker audio streams, a plurality of single-talker transcriptions <u>618</u> Merge the plurality of single-talker transcriptions into a multi-talker output transcription

FIG. 6

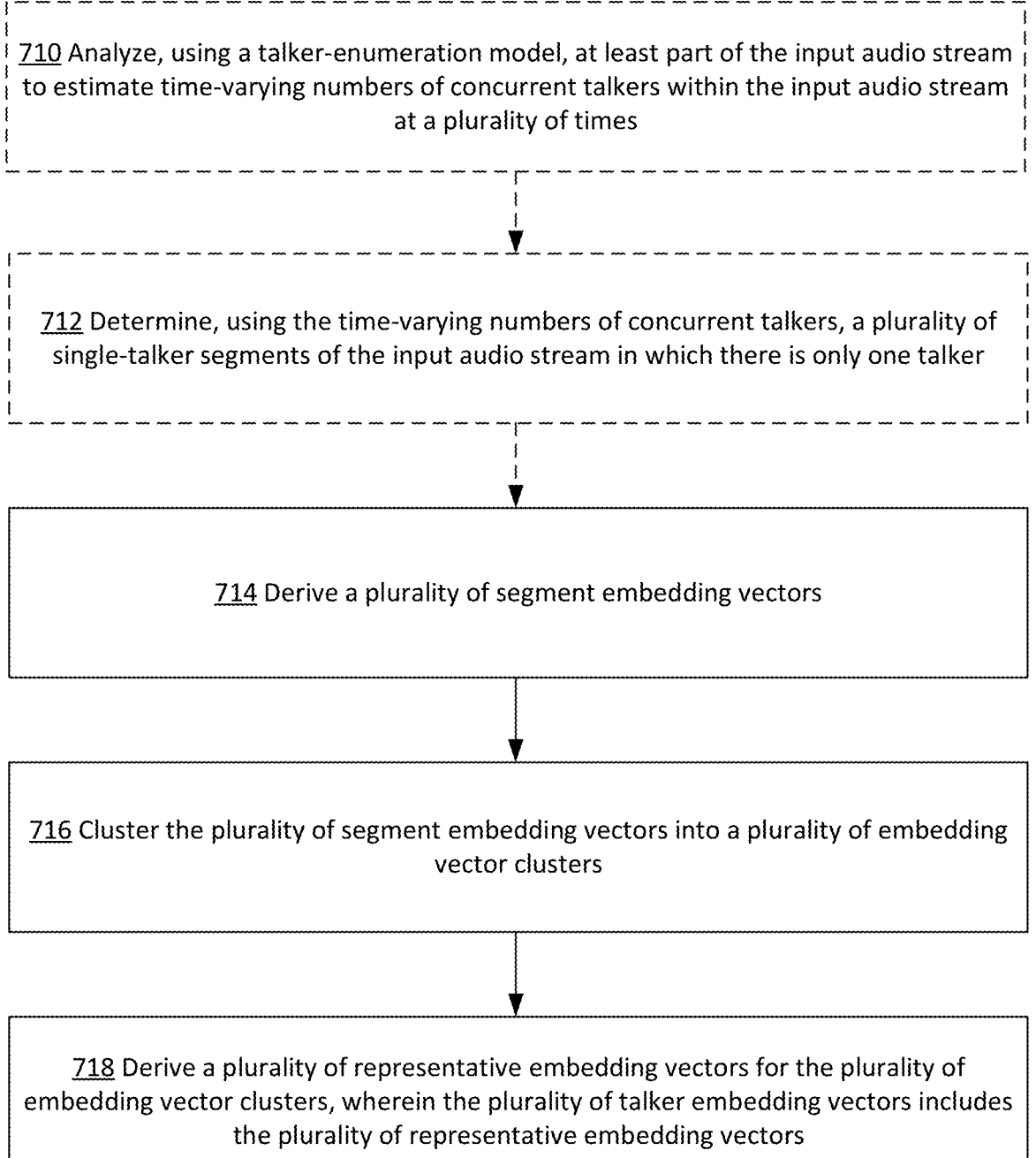

710 Analyze, using a talker-enumeration model, at least part of the input audio stream to estimate time-varying numbers of concurrent talkers within the input audio stream at a plurality of times 712 Determine, using the time-varying numbers of concurrent talkers, a plurality of single-talker segments of the input audio stream in which there is only one talker 714 Derive a plurality of segment embedding vectors 716 Cluster the plurality of segment embedding vectors into a plurality of embedding vector clusters 718 Derive a plurality of representative embedding vectors for the plurality of embedding vector clusters, wherein the plurality of talker embedding vectors includes the plurality of representative embedding vectors

FIG. 7

MULTI-TALKER AUDIO STREAM SEPARATION, TRANSCRIPTION AND DIARAIZATION

BACKGROUND

Automatic speech transcription is a valuable feature for archiving and accessibility. For example, the use of speech transcription may allow a record of a meeting, a performance, or other events to be generated and preserved. Also, in some examples, speech transcription may allow a textual indication of speech to be provided to viewers that may have difficulty hearing or in scenarios in which listeners are otherwise unable to clearly hear the speech. In some cases, such as in some noisy conditions or multi-talker scenarios, the performance of speech transcription systems may be degraded. Some speech transcription systems may be trained for situations in which a single talker is active or when there is clear turn-taking between multiple talkers. Thus, in some situations in which multiple talkers are active concurrently, the performance of some speech transcription systems may be degraded. Furthermore, in the event that the transcription system is also configured for diarization, talker labeling may be compromised when multiple talkers are simultaneously active.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 6 is a flowchart illustrating an example multi-talker audio stream separation, diarization and transcription process that may be used in accordance with the present disclosure.

FIG. 7 is a flowchart illustrating an example cluster-based embedding vector derivation process that may be used in accordance with the present disclosure.

DETAILED DESCRIPTION

Figure 1:
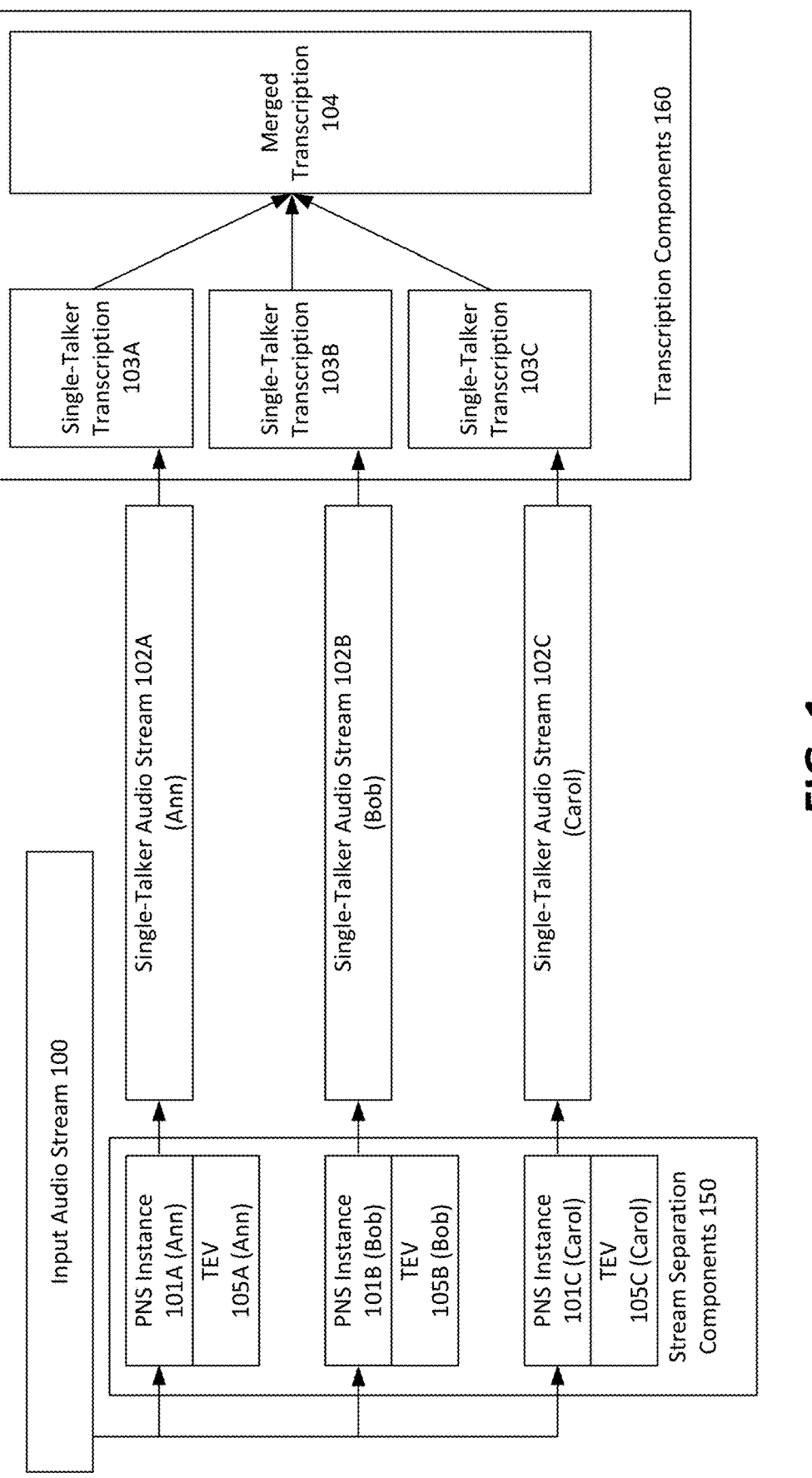
FIG. 1 is a diagram illustrating an example multi-talker audio stream separation, diarization and transcription system that may be used in accordance with the present disclosure.

Techniques for multi-talker audio stream separation, transcription and diarization are described herein. An input audio stream may include speech of a plurality of talkers. According to the techniques described herein, a plurality of talker embedding vectors may be derived, with each of the talker embedding vectors corresponding to a respective talker of the plurality of talkers in the input audio stream. Each talker embedding vector may represent respective voice characteristics of the respective talker. Additionally, a plurality of instances of a personalized noise suppression model may be executed on the input audio stream. Specifically, each instance of the personalized noise suppression model may correspond to a respective talker of the plurality of talkers and may employ the respective talker embedding vector for its respective talker. The personalized noise suppression model may be a machine learning model that is trained to preserve a particular voice represented by an embedding vector. Thus, each instance of the personalized noise suppression model may employ its respective embedding vector to preserve speech corresponding to its respective talker and to suppress any signals other than the respective talker's speech.

The plurality of instances of the personalized noise suppression model may be executed on the input audio stream to generate a plurality of single-talker audio streams. Each single-talker audio stream of the plurality of single-talker audio streams may be generated by a respective instance of the plurality of instances of the personalized noise suppression model by outputting only sounds, from the input audio stream, that correspond to the respective talker embedding vector. Thus, each single-talker audio stream may include speech only from a respective talker—and no other talkers. The plurality of single-talker audio streams may be generated using a consistent time representation scheme (e.g., consistent time stamps) that is consistent across the plurality of single-talker audio streams.

The plurality of single-talker audio streams may be provided to a transcription system, which may generate a plurality of single-talker transcriptions from the plurality of single-talker audio streams. Each single-talker transcription of the plurality of single-talker transcriptions may be generated from a respective single-talker audio stream of the plurality of single-talker audio streams. Thus, each single-talker transcription may be a transcription of speech only from a respective talker—and no other talkers. Each of the single-talker transcriptions may be generated using the consistent time representation scheme of the underlying single-talker audio streams. The plurality of single-talker transcriptions may then be merged, based on the consistent time representation scheme, into a multi-talker output transcription corresponding to the input audio stream.

In some examples, the plurality of talker embedding vectors may be derived based on a pre-enrollment process for the plurality of talkers. The term pre-enrollment, as used herein, refers to an enrollment process for the plurality of talkers in which the plurality of talker embedding vectors are derived before the generation of the input audio stream is initiated and/or before the input audio stream is processed for transcription. During the pre-enrollment process, audio samples of speech of each of the plurality of talkers may be analyzed in order to derive the plurality of talker embedding vectors. Specifically, a set of one or more audio samples may be provided for each talker and may include speech only for that respective talker—and no other talkers. The talker embedding vector for the respective talker may then be derived based on the set of one or more audio samples. In some examples, identity data indicating an identity of the talker may be associated with both the respective set of one or more audio samples and the respective talker embedding vector that is derived from the respective set of one or more audio samples. The identity data may allow the talker's identity to be indicated in association with transcribed speech from the talker in both the talker's respective single-talker audio stream and in the multi-talker output transcription. In some cases, because it allows the plurality of talker embedding vectors to be derived before the input audio stream is generated, the pre-enrollment process may be particularly suitable for online applications in which live transcription is employed.

In some other examples, the plurality of talker embedding vectors may be derived based on a cluster-based embedding vector derivation. In the cluster-based embedding vector derivation, the talker embedding vectors are derived based on the input audio stream itself. Thus, unlike the pre-enrollment process, the cluster-based embedding vector derivation does not allow the plurality of talker embedding vectors to be derived before generation of the input audio stream is initiated. Rather, in the cluster-based embedding vector derivation, the plurality of talker embedding vectors are derived either after the input audio stream is fully generated (referred to hereinafter as a post-completion cluster-based embedding vector derivation) or while generation of the input audio stream is in-progress (referred to hereinafter as an in-progress cluster-based embedding vector derivation).

During the post-completion cluster-based embedding vector derivation, a talker-enumeration machine learning model may analyze the input audio stream in its entirety to estimate time-varying numbers of concurrent talkers within the input audio stream at a plurality of times. The time-varying numbers of concurrent talkers may then be used to determine a plurality of single-talker segments of the input audio stream in which there is only one talker. A plurality of segment embedding vectors may then be derived from the plurality of single-talker segments, in which one or more segment embedding vectors of the plurality of segment embedding vectors are derived for each single-talker segment of the plurality of single-talker segments. The plurality of segment embedding vectors may then be clustered into a plurality of embedding vector clusters. Each embedding vector cluster may correspond to a respective talker of the plurality of talkers. A plurality of representative embedding vectors may then be derived from the plurality of embedding vector clusters. Each representative embedding vector of the plurality of representative embedding vectors may be derived for a respective embedding vector cluster of the plurality of embedding vector clusters. The plurality of representative embedding vectors may then be used as the plurality of talker embedding vectors. Because the post-completion cluster-based embedding vector derivation is not performed until after the input audio stream is fully generated, the post-completion cluster-based embedding vector derivation may be particularly suitable for offline non-live applications.

The in-progress cluster-based embedding vector derivation may be similar to the post-completion cluster-based embedding vector derivation, with some exceptions. Specifically, while the post-completion cluster-based embedding vector derivation may be performed on the entire input audio stream after the input audio stream is fully generated, the in-progress cluster-based embedding vector derivation may be performed repeatedly, in a running fashion, during generation of the input audio stream. Specifically, the in-progress cluster-based embedding vector derivation may be performed repeatedly, in multiple iterations, on different portions of the input audio stream as those portions are generated. Thus, for the in-progress cluster-based embedding vector derivation, the number of talkers and the talker clustering may be estimated in a running fashion. Additionally, for the in-progress cluster-based embedding vector derivation, talker enumeration, talker clustering, and representative talker embeddings may be continuously improved (e.g., on each iteration of the derivation) so that the speech extraction performance improves as the stream progresses.

Thus, by separating an input audio stream into a plurality of single-talker audio streams, generating single-talker transcripts, and merging the single-talker audio transcripts into a multi-talker output transcript, the techniques described herein allow multi-talker speech separation, transcription and diarization. It is noted that the techniques described herein may be particularly advantageous for speech transcription and diarization in scenarios when background speech is present, such as call centers, events with audiences, and the like. The techniques described herein may also be particularly advantageous for speech transcription and diarization in scenarios in which multiple talkers are simultaneously active.

FIG. 1 is a diagram illustrating an example multi-talker audio stream separation, diarization and transcription system that may be used in accordance with the present disclosure. In the example of FIG. 1, an input audio stream 100 includes speech from three talkers, which include Ann, Bob and Carol. Input audio stream 100 may include audio from a wide variety of sources, for example including an online meeting, a phone call, a call center, a movie, a television show, an event (e.g., sporting event, news event, entertainment event, a performance, etc.), and/or other sources. In some examples, input audio stream 100 may be a live stream, which is captured and played to listeners with no appreciable delay between the time that the stream is captured and the time that the stream is played to listeners. In some other examples, input audio stream 100 may be a pre-recorded stream, which is recorded in advance, saved, and then played to listeners at a later time after the input audio stream has been fully generated.

As will be described in detail below, talker embedding vectors (TEV's) 105A-C may be derived for the talkers in the input audio stream 100. In this example, talker embedding vector (TEV) 105A corresponds to Ann, TEV 105B corresponds to Bob, and TEV 105C corresponds to Carol. Each TEV 105A-C may represent respective voice characteristics of the respective talker. Specifically, TEV 105A represents voice characteristics of Ann, TEV 105B represents voice characteristics of Bob, and TEV 105C represents voice characteristics of Carol. Additionally, in this example, stream separation components 150 execute personalized noise suppression (PNS) instances 101A-C on the input audio stream 100. The PNS instances 101A-C are instances of a personalized noise suppression model. Each PNS instance 101A-C corresponds to a respective talker of the plurality of talkers in the input audio stream 100. Specifically, PNS instance 101A corresponds to Ann, PNS instance 101B corresponds to Bob, and PNS instance 101C corresponds to Carol. Additionally, each PNS instance 101A-C employs one of TEV's 105A-C for its respective talker. Specifically, PNS instance 101A employs TEV 105A, PNS instance 101B employs TEV 105B, and PNS instance 101C employs TEV 105C. The personalized noise suppression model may be a machine learning model that is trained to preserve a particular voice represented by an embedding vector. Thus, each PNS instance 101A-C may employ a TEV 105A-C, respectively, to preserve speech corresponding to its respective talker and to suppress any signals other than the respective talker's speech.

As shown in FIG. 1, PNS instances 101A-C may be executed on the input audio stream 100 to generate single-talker audio streams 102A-C. Specifically, single-talker audio stream 102A corresponds to Ann, single-talker audio stream 102B corresponds to Bob, and single-talker audio stream 102C corresponds to Carol. Each single-talker audio stream 102A-C is generated by a respective one of the PNS instances 101A-C by outputting only sounds, from the input audio stream 100, that correspond to the respective one of the TEV's 105A-C. Thus, each single-talker audio stream 102A-C may include speech only from a respective talker— and no other talkers. Specifically, single-talker audio stream 102A may include speech only from Ann, single-talker audio stream 102B may include speech only from Bob, and single-talker audio stream 102C may include speech only from Carol. The single-talker audio streams 102A-C may be generated using a consistent time representation scheme (e.g., consistent time stamps) that is consistent across the single-talker audio streams 102A-C.

As also shown in FIG. 1, the single-talker audio streams 102A-C may be provided to transcription components 160, which may generate single-talker transcriptions 103A-C from the single-talker audio streams 102A-C. Each single-talker transcription 103A-C is generated from a respective one of single-talker audio streams 102A-C. Thus, each single-talker transcription 103A-C may be a transcription of speech only from a respective talker—and no other talkers. Specifically, single-talker transcription 103A may be a transcription of speech only from Alice, single-talker transcription 103B may be a transcription of speech only from Bob, and single-talker transcription 103C may be a transcription of speech only from Carol. Each of the single-talker transcriptions 103A-C may be generated using the consistent time representation scheme of the underlying single-talker audio streams. For example, each of the single-talker transcriptions 103A-C may include indications of words that were spoken by a respective talker and indications of the times that those words were spoken.

The transcription components 160 may then merge the single-talker transcriptions 103A-C into merged transcription 104. The merged transcription 104 is a multi-talker output transcription corresponding to the input audio stream 100. The single-talker transcriptions 103A-C may be merged into merged transcription 104 based on the consistent time representation scheme. For example, the merged transcription 104 may include indications of words that were spoken by each of the talkers in the input audio stream 100 (e.g., Alice, Bob and Carol), indications of the times that those words were spoken, and indications of the identity of the talkers that spoke those words. In some examples, the identity of the talkers may be determined based on the single-talker transcription 103A-C from which the words are obtained. For example, it may be determined that words obtained from single-talker transcription 103A are spoken by Ann, that words obtained from single-talker transcription 103B are spoken by Bob, and that that words obtained from single-talker transcription 103C are spoken by Carol.

Figure 2:
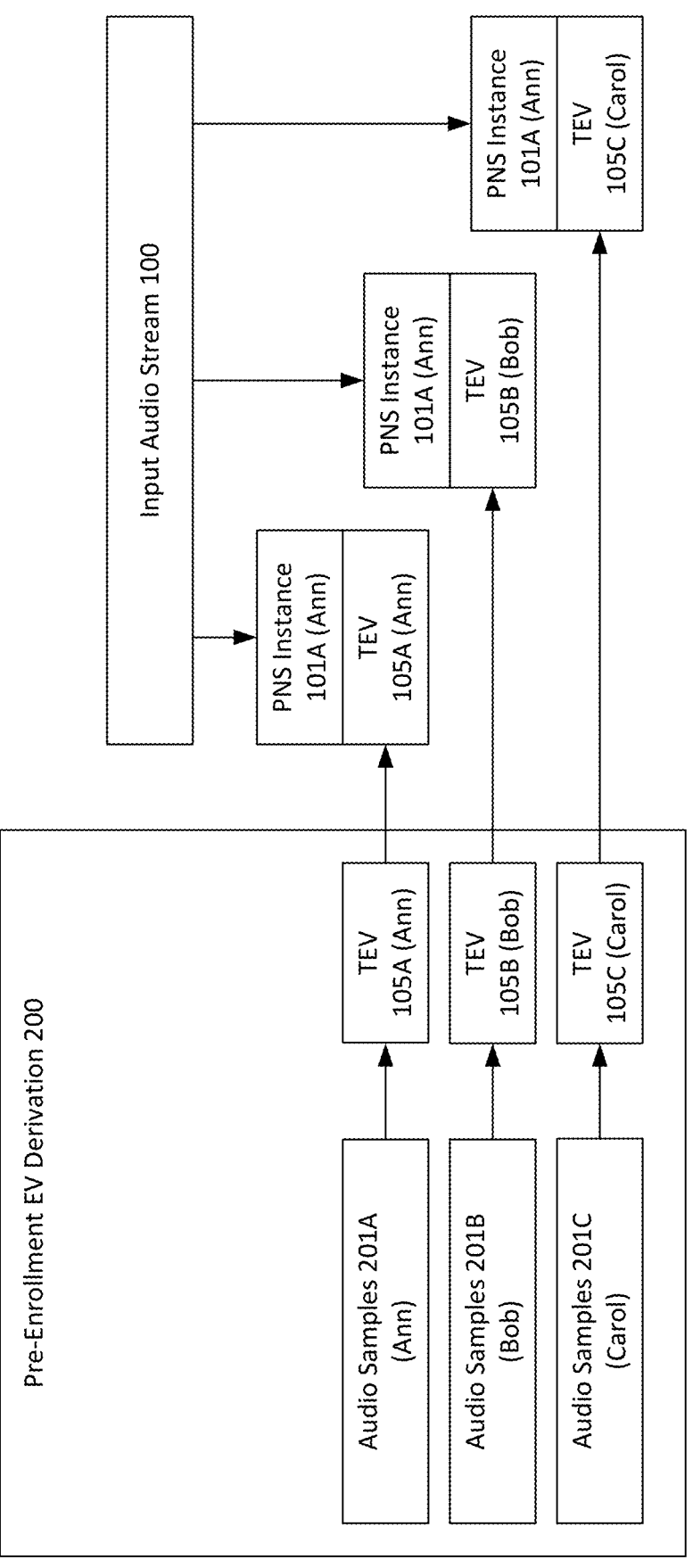
FIG. 2 is a diagram illustrating example pre-enrollment embedding vector derivation that may be used in accordance with the present disclosure.
Figure 3:
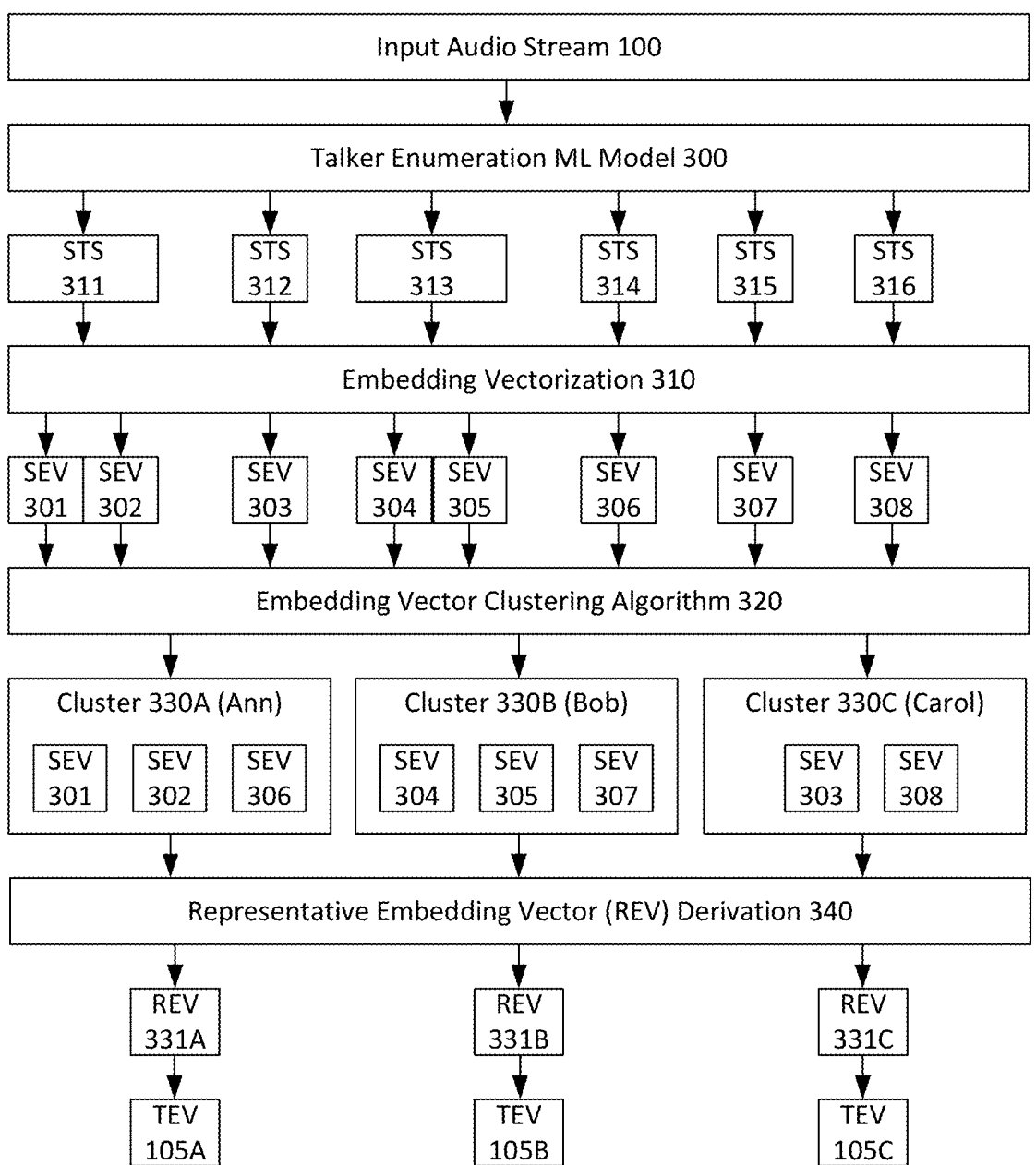
FIG. 3 is a diagram illustrating an example post-completion cluster-based embedding vector derivation that may be used in accordance with the present disclosure.
Figure 4:
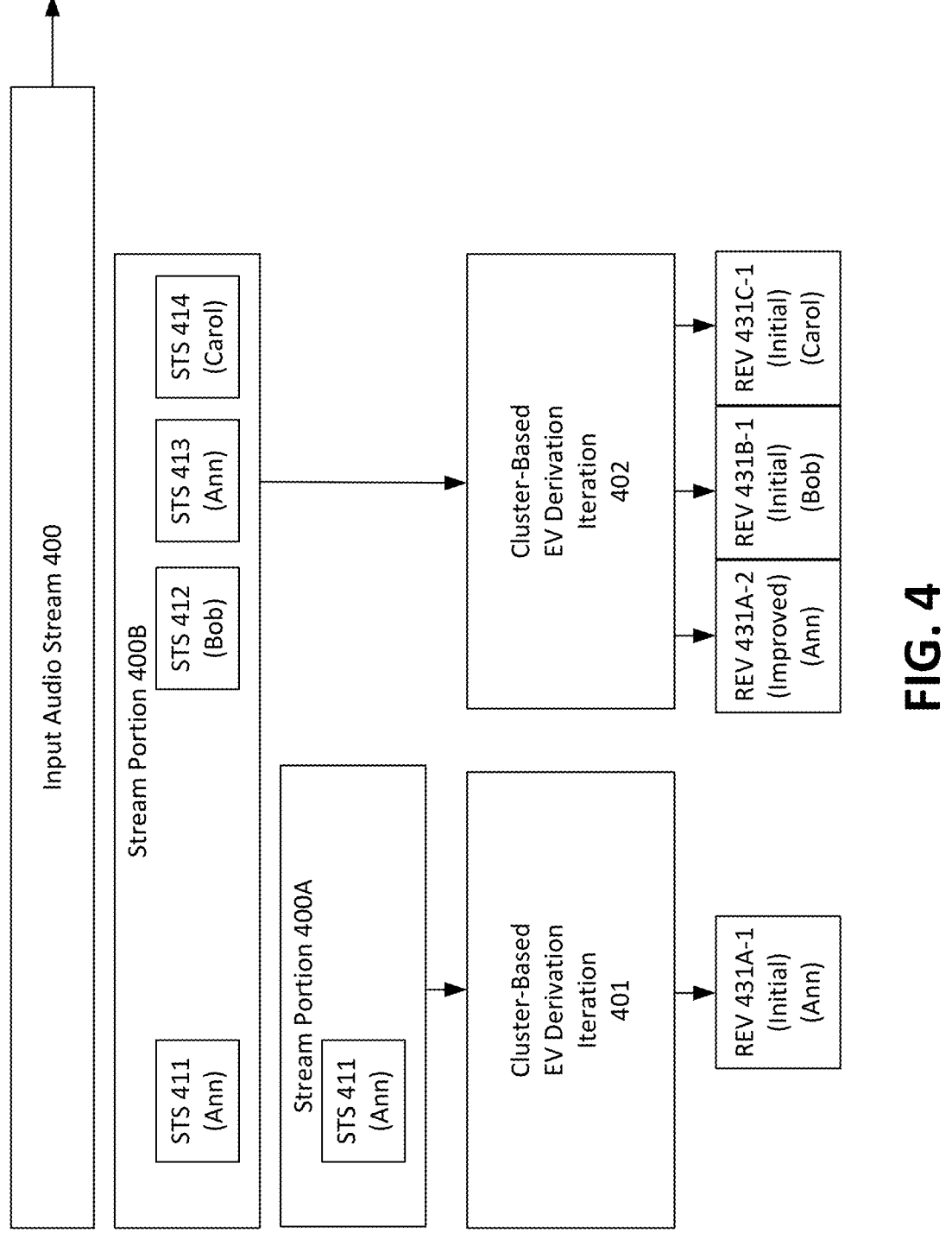
FIG. 4 is a diagram illustrating an example in-progress cluster-based embedding vector derivation that may be used in accordance with the present disclosure.

Referring now to FIGS. 2-4, some examples are shown of techniques that may be employed to generate TEV's 105A-C. These example techniques may include pre-enrollment embedding vector derivation (see, e.g., FIG. 2), post-completion cluster-based embedding vector derivation (see, e.g., FIG. 3), and in-progress cluster-based embedding vector derivation (see, e.g., FIG. 4). Referring now to FIG. 2, an example of pre-enrollment embedding vector (EV) derivation 200 will now be described. The term pre-enrollment, as used herein, refers to an enrollment process for the plurality of talkers in which the plurality of talker embedding vectors (e.g., TEV's 105A-C) are derived before the generation of the input audio stream 100 is initiated and/or before the input audio stream 100 is processed for transcription. During the pre-enrollment embedding vector (EV) derivation 200, audio samples 201A-C of speech of each of the talkers may be analyzed in order to derive the plurality of TEV's 105A-C. In this example, audio samples 201A include samples of speech only of Ann (and no other talker), audio samples 201B include samples of speech only of Bob (and no other talker), and audio samples 201C include samples of speech only of Carol (and no other talker). TEV 105A may be derived based on audio samples 201A, TEV 105B may be derived based on audio samples 201B, and TEV 105C may be derived based on audio samples 201C. After the pre-enrollment embedding vector (EV) derivation 200, the input audio stream may then be processed, as shown in FIG. 1, by having PNS instances 101A-C analyze the input audio stream 100 using the TEV's 105A-C, respectively.

In some examples, as part of pre-enrollment embedding vector (EV) derivation 200, identity data indicating an identity of a respective talker may be associated with both the audio samples 201A-C and the TEV's 105A-C that are derived from the audio samples 201A-C. For example, identity data indicating the identity of Ann may be associated with audio samples 201A and TEV 105A, identity data indicating the identity of Bob may be associated with audio samples 201B and TEV 105B, and identity data indicating the identity of Carol may be associated with audio samples 201C and TEV 105C. The identity data may allow the talker's identity to be indicated in association with transcribed speech from the talker in both the single-talker transcriptions 103A-C and in the merged transcription 104. In some cases, because it allows the TEV's 105A-C to be derived before the input audio stream 100 is generated, the pre-enrollment embedding vector (EV) derivation 200 may be particularly suitable for online applications in which live transcription is employed.

In some other examples, the TEV's 105A-C may be derived based on a cluster-based embedding vector derivation. In the cluster-based embedding vector derivation, the TEV's 105A-C are derived based on the input audio stream 100 itself. Thus, unlike the pre-enrollment embedding vector (EV) derivation 200 of FIG. 2, the cluster-based embedding vector derivation does not allow the TEV's 105A-C to be derived before generation of the input audio stream 100 is initiated. Rather, in the cluster-based embedding vector derivation, the TEV's 105A-C are derived either after the input audio stream is fully generated (referred to hereinafter as a post-completion cluster-based embedding vector derivation) or while generation of the input audio stream is in-progress (referred to hereinafter as an in-progress cluster-based embedding vector derivation).

Referring now to FIG. 3, an example of post-completion cluster-based embedding vector derivation will now be described. As shown in FIG. 3, during the post-completion cluster-based embedding vector derivation, a talker-enumeration machine learning (ML) model 300 may analyze the input audio stream 100 in its entirety to estimate time-varying numbers of concurrent talkers within the input audio stream 100 at a plurality of times. Specifically, the talker-enumeration ML model 300 may estimate a quantity of talkers that are speaking within the input audio stream 100 at any given time. The time-varying numbers of concurrent talkers may then be used to determine single-talker segments (STS's) 311-316 of the input audio stream 100. Each single-talker segment (STS) 311-316 is a segment of the input audio stream 100 in which there is only one talker. An embedding vectorization 310 may then be performed on each STS 311-316 to derive segment embedding vectors (SEV's) 301-308. Each STS 311-316 includes at least one of the SEV's 301-308. In the example of FIG. 3, SEV's 301 and 302 are derived for STS 311, segment embedding vector (SEV) 303 is derived for STS 312, SEV's 304 and 305 are derived for STS 313, SEV 306 is derived for STS 314, SEV 307 is derived for STS 315, and SEV 308 is derived for STS 316. In this example, each SEV 301-308 is an embedding vector that represents the audio characteristics of a person that is talking in a respective one of the STS's 311-316. For example, SEV's 301 and 302 may represent the audio characteristics of a person that is talking in STS 311. SEV 301 may be generated based on speech in a first half of STS 311, while SEV 302 may be generated based on speech in a second half of STS 312. Thus, although they may represent the speech of the same person, SEV 301 and SEV 302 may be slightly different from one another, as a person's speech characteristics (e.g., tone, pitch, volume/amplitude, speed of talking, etc.) may change slightly over time.

An embedding vector clustering algorithm 320 may then be executed on the SEV's 301-308 to cluster the SEV's 301-308 into embedding vector clusters 330A, 330B and 330C. In this example, embedding vector cluster 330A includes SEV's 301, 302 and 306, embedding vector cluster 330B includes SEV's 304, 305 and 307, and embedding vector cluster 330C includes SEV's 303 and 308. The embedding vector clustering algorithm 320 may cluster the SEV's 301-308 into the embedding vector clusters 330A-C based on the relative similarities between the SEV's 301-308. For example, SEV's 301, 302 and 306, which are clustered into embedding vector cluster 330A, may have greater similarity to each other than to any of the SEV's 303-305, 307 and 308, which are not included in the embedding vector cluster 330A. Similarly, SEV's 304, 305 and 307, which are clustered into embedding vector cluster 330B, may have greater similarity to each other than to any of the SEV's 301-303, 306 and 308, which are not included in the embedding vector cluster 330B. Additionally, SEV's 303 and 308, which are clustered into embedding vector cluster 330C, may have greater similarity to each other than to any of the SEV's 301-302 and 304-307, which are not included in the embedding vector cluster 330C.

Each embedding vector cluster 330A-C may correspond to a respective talker of the plurality of talkers. Specifically, embedding vector cluster 330A corresponds to Ann, embedding vector cluster 330B corresponds to Bob, and embedding vector cluster 330C corresponds to Carol. In this example, because there are three talkers in the input audio stream 100 (Ann, Bob and Carol), three embedding vector clusters 330A-C are formed. It is noted that, for cluster-based embedding vector derivation, the number of talkers in the input audio stream 100 (and the number of embedding vector clusters 330A-C that are formed via the clustering) are not known in advance. Rather, the number of talkers and embedding vector clusters 330A-C are instead determined based on the result of the clustering, such as based on the relative similarities between the SEV's 301-308.

During representative embedding vector (REV) derivation 340, representative embedding vectors (REV's) 331A-C may be derived from the embedding vector clusters 330A-C. Specifically, REV 331A is derived from embedding vector cluster 330A, REV 331B is derived from embedding vector cluster 330B, and REV 331C is derived from embedding vector cluster 330C. REV 331A is an embedding vector that is representative of the SEV's 301, 302 and 306 within the embedding vector cluster 330A. For example, REV 331A may be the centroid, or may be generated based on the centroid, of SEV's 301, 302 and 306. REV 331B is an embedding vector that is representative of the SEV's 304, 305 and 307 within the embedding vector cluster 330B. For example, REV 331B may be the centroid, or may be generated based on the centroid, of SEV's 304, 305 and 307. REV 331C is an embedding vector that is representative of the SEV's 303 and 308 within the embedding vector cluster 330C. For example, REV 331C may be the centroid, or may be generated based on the centroid, of SEV's 303 and 308. The REV's 331A-C may then be used as TEV's 105A-C for the respective talkers. Specifically, REV 331A may be used as TEV 105A for Ann, REV 331B may be used as TEV 105B for Bob, and REV 331C may be used as TEV 105C for Carol. Because the post-completion cluster-based embedding vector derivation is not performed until after the input audio stream 100 is fully generated, the post-completion cluster-based embedding vector derivation may be particularly suitable for offline non-live applications.

Referring now to FIG. 4, an example of in-progress cluster-based embedding vector derivation will now be described in detail. In the example of FIG. 4, the in-progress cluster-based embedding vector derivation is performed on input audio stream 400, which also includes audio of talkers Ann, Bob and Carol. Input audio stream 400 includes stream portions 400A-B and optionally any number of additional stream portions (not shown in FIG. 4). The in-progress cluster-based embedding vector derivation may be similar to the post-completion cluster-based embedding vector derivation, with some exceptions. Specifically, while the post-completion cluster-based embedding vector derivation may be performed on the input audio stream 100, in its entirety, after the input audio stream 100 is fully generated, the in-progress cluster-based embedding vector derivation may be performed repeatedly, in a running fashion, as the input audio stream 400 is being generated. Specifically, the in-progress cluster-based embedding vector derivation may be performed repeatedly, in multiple iterations (e.g., cluster-based EV derivation iterations 401-402), on different portions (e.g., stream portions 400A-B) of the input audio stream 400 as those portions are generated. Thus, for the in-progress cluster-based embedding vector derivation, the number of talkers and the talker clustering may be estimated in a running fashion. Additionally, for the in-progress cluster-based embedding vector derivation, talker enumeration, talker clustering, and representative talker embeddings may be continuously improved (e.g., on each iteration of the derivation) so that the speech extraction performance improves as the stream progresses.

Each of the cluster-based EV derivation iterations 401-402 of FIG. 4 may be performed by executing the actions described above with reference to FIG. 3. Specifically, each of the cluster-based EV derivation iterations 401-402 may include analyzing a respective one of the stream portions 400A-B using talker enumeration ML model 300 to estimate time-varying numbers of concurrent talkers within the respective one of the stream portions 400A-B at a plurality of times. The time-varying numbers of concurrent talkers may then be used to determine a plurality of single-talker segments of the respective one of the stream portions 400A-B in which there is only one talker. During embedding vectorization 310, a plurality of segment embedding vectors may then be derived from the plurality of single-talker segments. The embedding vector clustering algorithm 320 may then be performed to cluster the plurality of segment embedding vectors into one or more embedding vector clusters. Each embedding vector cluster may correspond to a respective talker of the plurality of talkers. The representative embedding vector derivation 340 may then be performed to derive one or more representative embedding vectors from the one or more embedding vector clusters. The one or more representative embedding vectors may then be used as one or more of the TEV's 105A-C.

For example, as shown in FIG. 4, cluster-based EV derivation iteration 401 is performed on stream portion 400A. In this example, stream portion 400A includes only one single-talker segment (STS), which is STS 411. As shown, STS 411 includes audio of Ann. Thus, cluster-based EV derivation iteration 401 provides only representative embedding vector (REV) 431A-1, which is an initial REV corresponding to Ann. By contrast, stream portion 400B includes four STS's, which are STS's 411-414. As shown, STS 411 includes audio of Ann, STS 412 includes audio of Bob, STS 413 includes additional audio of Ann, and STS 414 includes audio of Carol. Accordingly, cluster-based EV derivation 402 provides REV 431A-2, REV 431B-1 and REV 431C-1. Specifically, REV 431B-1 is an initial REV corresponding to Bob, REV 431C-1 is an initial REV corresponding to Carol, and REV 431A-2 is an improved REV corresponding to Ann. Thus, while cluster-based EV derivation iteration 401 reflected only a single talker (Ann), cluster-based EV derivation 402 reflects three talkers (Ann, Bob and Carol). Moreover, cluster-based EV derivation 402 also generates a more accurate representation of Ann's voice. Specifically, while REV 431A-1 was generated based only on STS 411 (which corresponds to Ann), REV 431A-2 is generated based on both STS 411 and STS 413 (which both correspond to Ann). Thus, because it is generated based on a greater number of samples of Ann's voice, REV 431A-2 is an improved REV that more accurately represents Ann's voice than REV 431A-1.

Figure 5:
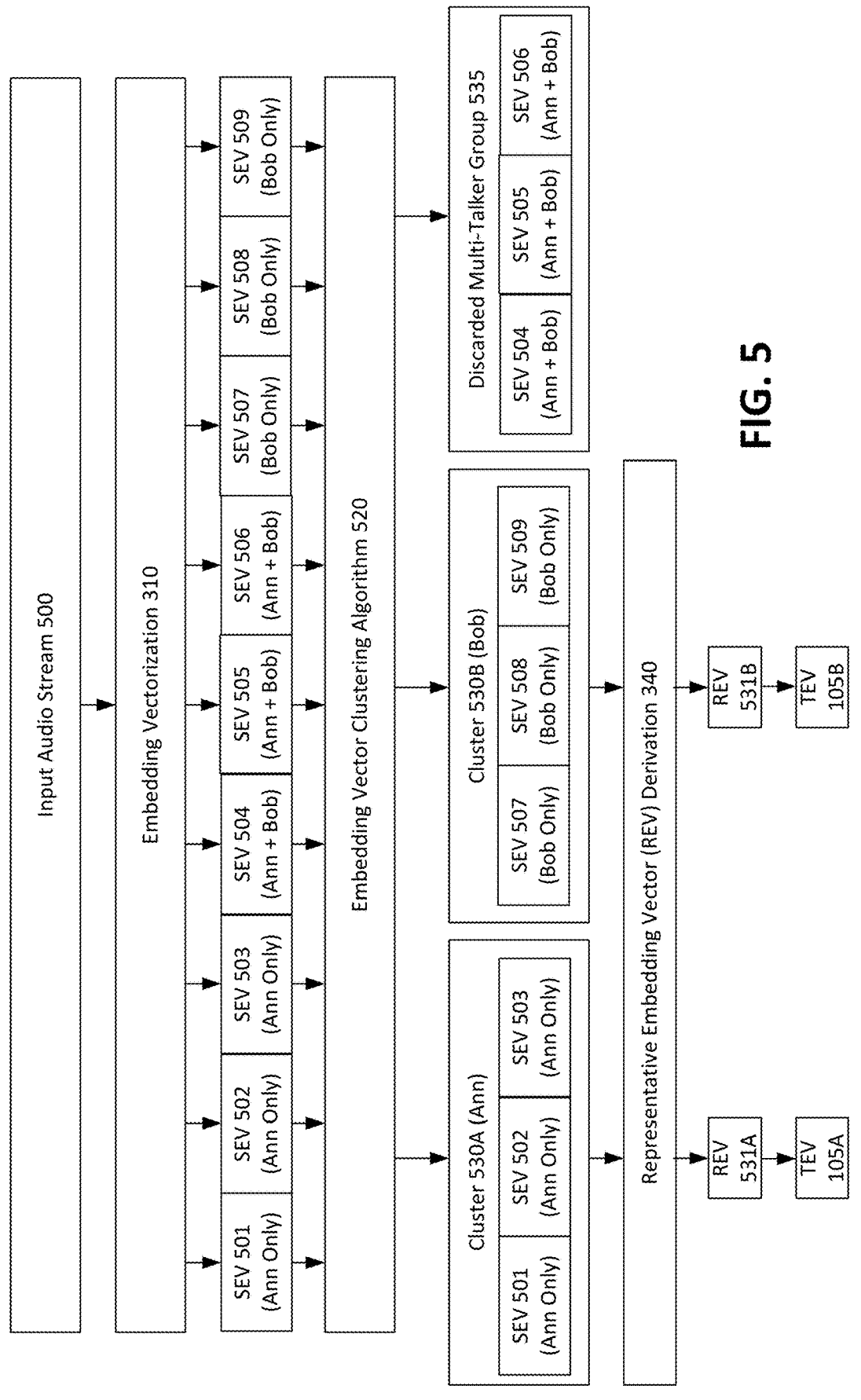
FIG. 5 is a diagram illustrating an example clustering with discarded multi-talker embedding vectors that may be used in accordance with the present disclosure.

In the example of FIG. 3 described above, talker enumeration ML model 300 is executed on the input audio stream to determine STS's 311-316. The embedding vectorization 310 is then performed only on the STS's 311-316 to determine SEV's 301-308. However, in some other examples, it may not be necessary to execute the talker enumeration ML model 300 prior to embedding vectorization 310. Referring now to FIG. 5, an example is shown of an alternative technique in which the talker enumeration ML model 300 is not executed prior to embedding vectorization 310. Rather, in the alternative technique of FIG. 5, embedding vectorization 310 is performed on an entire input audio stream 500 (or a portion thereof) and not only on single-talker segments. In this alternative technique, the embedding vectors corresponding to multi-talker segments are detected during the clustering process and are then discarded, meaning that they are not used to determine representative embedding vectors.

As shown in FIG. 5, embedding vectorization 310 is performed on input audio stream 500 to generate nine segment embedding vectors (SEV's) 501-509. Specifically, SEV's 501-503 correspond to a first portion of the input audio stream 500 in which only Ann is speaking. Additionally, SEV's 504-506 correspond to a second portion of the input audio stream 500 in which both Ann and Bob are speaking. Furthermore, SEV's 507-509 correspond to a third portion of the input audio stream 500 in which only Bob is speaking.

In this example, embedding vector clustering algorithm 520 is executed on the SEV's 501-509. The embedding vector clustering algorithm 520 clusters SEV's 501-503 into embedding vector cluster 530A corresponding to Ann. Additionally, the embedding vector clustering algorithm 520 clusters SEV's 507-509 into embedding vector cluster 530B corresponding to Bob. Furthermore, the embedding vector clustering algorithm 520 detects that SEV's 504-506 correspond to portions of the input audio stream 500 in which multiple talkers (e.g., Ann and Bob) are speaking simultaneously. The embedding vector clustering algorithm 520 groups SEV's 504-506 into discarded multi-talker group 535. A variety of techniques may be employed to detect that SEV's 504-506 correspond to portions of the input audio stream 500 in which multiple talkers (e.g., Ann and Bob) are speaking simultaneously. In some examples, the embedding vector clustering algorithm 520 may examine the temporal (time-based) relationships between SEV's 501-509. Specifically, the embedding vector clustering algorithm 520 may examine neighborhoods of SEV's, which include two or more adjacent SEV's in succession (or otherwise in close time proximity to one another), to determine the amount of similarity or correlation between the adjacent SEV's. For example, for scenarios in which only a single person is speaking in adjacent SEV's, it is expected that those adjacent SEV's will have a high degree of similarity to one another since they correspond to speech from the same person. By contrast, for scenarios in which multiple talkers are speaking simultaneously in adjacent SEV's, it is expected that those SEV's will not have a high degree of similarity since they correspond to speech from more than one person. In the example of FIG. 5, it may be determined that adjacent SEV's 501-503 have a high degree of similarity to one another and therefore correspond to the same person (Ann). Additionally, it may be determined that adjacent SEV's 507-509 also have a high degree of similarity to one another and therefore correspond to the same person (Bob). By contrast, it may be determined that adjacent SEV's 504-506 do not have a high degree of similarity to one another and therefore correspond to a portion of the input audio stream 500 in which multiple talkers (Ann and Bob) are speaking simultaneously.

As also shown in FIG. 5, a representative embedding vector (REV) 531A is determined for embedding vector cluster 530A and is used as TEV 105A for Ann. Additionally, an REV 531B is determined for embedding vector cluster 530B and is used as TEV 105B for Bob. It is noted, however, that no REV is determined for discarded multi-talker group 535. It is noted that the alternative technique of FIG. 5 may be employed for both post-completion cluster-based embedding vector derivation and, also, for in-progress cluster-based embedding vector derivation.

FIG. 6 is a flowchart illustrating an example multi-talker audio stream separation, diarization and transcription process that may be used in accordance with the present disclosure. At operation 610, a plurality of talker embedding vectors are derived. The plurality of talker embedding vectors may correspond to a plurality of talkers in an input audio stream. Each talker embedding vector of the plurality of talker embedding vectors may correspond to a respective talker of the plurality of talkers and may represent respective voice characteristics of the respective talker. For example, as shown in FIG. 1, input audio stream 100 includes speech from three talkers, which include Ann, Bob and Carol. Talker embedding vectors (TEV's) 105A-C may be derived for the talkers in the input audio stream 100. In this example, TEV 105A corresponds to Ann, TEV 105B corresponds to Bob, and TEV 105C corresponds to Carol. Each TEV 105A-C may represent respective voice characteristics of the respective talker. Specifically, TEV 105A represents voice characteristics of Ann, TEV 105B represents voice characteristics of Bob, and TEV 105C represents voice characteristics of Carol.

Some example techniques for derivation of the TEV's 105A-C are described in detail above and are not repeated here. Specifically, the deriving of the plurality of talker embedding vectors may include performing an enrollment process in which the plurality of talkers are enrolled, such as pre-enrollment EV derivation 200 of FIG. 2. Additionally, the deriving of the plurality of talker embedding vectors may include performing a cluster-based embedding vector derivation. In some examples, the cluster-based embedding vector derivation may be performed after the input audio stream is fully generated and may be performed on all of the input audio stream (e.g., the post-completion cluster-based embedding vector derivation of FIG. 3). Also, in some examples, the cluster-based embedding vector derivation may be performed in a running fashion during generation of the input audio stream and may be performed repeatedly on different portions of the input audio stream as the different portions are generated (e.g., the in-progress cluster-based embedding vector derivation of FIG. 4). Moreover, the alternative technique shown in FIG. 5 may optionally be employed for both post-completion cluster-based embedding vector derivation and in-progress cluster-based embedding vector derivation.

At operation 612, a plurality of instances of a personalized noise suppression model are executed on the input audio stream. Each instance of the plurality of instances of the personalized noise suppression model employs a respective talker embedding vector of the plurality of talker embedding vectors. For example, as shown in FIG. 1, stream separation components 150 execute personalized noise suppression (PNS) instances 101A-C on the input audio stream 100. The PNS instances 101A-C are instances of a personalized noise suppression model. Each PNS instance 101A-C corresponds to a respective talker of the plurality of talkers in the input audio stream 100. Specifically, PNS instance 101A corresponds to Ann, PNS instance 101B corresponds to Bob, and PNS instance 101C corresponds to Carol. Additionally, each PNS instance 101A-C employs one of TEV's 105A-C for its respective talker. Specifically, PNS instance 101A employs TEV 105A, PNS instance 101B employs TEV 105B, and PNS instance 101C employs TEV 105C. The personalized noise suppression model may be a machine learning model that is trained to preserve a particular voice represented by an embedding vector. Thus, each PNS instance 101A-C may employ a TEV 105A-C, respectively, to preserve speech corresponding to its respective talker and to suppress any signals other than the respective talker's speech.

At operation 614, a plurality of single-talker audio streams are generated by the plurality of instances of the personalized noise suppression model. The plurality of single-talker audio streams may correspond to the input audio stream. Each single-talker audio stream of the plurality of single-talker audio streams may be generated by a respective instance of the plurality of instances of the personalized noise suppression model by outputting only sounds, from the input audio stream, that correspond to the respective talker embedding vector. The plurality of single-talker audio streams may be generated using a consistent time representation scheme that is consistent across the plurality of single-talker audio streams. For example, as shown in FIG. 1, PNS instances 101A-C may be executed on the input audio stream 100 to generate single-talker audio streams 102A-C. Specifically, single-talker audio stream

102A corresponds to Ann, single-talker audio stream 102B corresponds to Bob, and single-talker audio stream 102C corresponds to Carol. Each single-talker audio stream 102A-C is generated by a respective one of the PNS instances 101A-C by outputting only sounds, from the input audio stream 100, that correspond to the respective one of the TEV's 105A-C. Thus, each single-talker audio stream 102A-C may include speech only from a respective talker— and no other talkers. Specifically, single-talker audio stream 102A may include speech only from Ann, single-talker audio stream 102B may include speech only from Bob, and single-talker audio stream 102C may include speech only from Carol. The single-talker audio streams 102A-C may be generated using a consistent time representation scheme (e.g., consistent time stamps) that is consistent across the single-talker audio streams 102A-C.

At operation 616, a plurality of single-talker transcriptions are generated based on the plurality of single-talker audio streams. Each single-talker transcription of the plurality of single-talker transcriptions may be generated based on a respective single-talker audio stream of the plurality of single-talker audio streams. For example, as shown in FIG. 1, the single-talker audio streams 102A-C may be provided to transcription components 160, which may generate single-talker transcriptions 103A-C from the single-talker audio streams 102A-C. Each single-talker transcription 103A-C is generated from a respective one of single-talker audio streams 102A-C. Thus, each single-talker transcription 103A-C may be a transcription of speech only from a respective talker—and no other talkers. Specifically, single-talker transcription 103A may be a transcription of speech only from Alice, single-talker transcription 103B may be a transcription of speech only from Bob, and single-talker transcription 103C may be a transcription of speech only from Carol. Each of the single-talker transcriptions 103A-C may be generated using the consistent time representation scheme of the underlying single-talker audio streams. For example, each of the single-talker transcriptions 103A-C may include indications of words that were spoken by a respective talker and indications of the times that those words were spoken.

At operation 618, the plurality of single-talker transcriptions are merged into a multi-talker output transcription. The plurality of single-talker transcriptions may be merged into the multi-talker output transcription based on the consistent time representation scheme. The multi-talker output transcription may correspond to the plurality of talkers. For example, as shown in FIG. 1, the transcription components 160 may merge the single-talker transcriptions 103A-C into merged transcription 104. The merged transcription 104 is a multi-talker output transcription corresponding to the input audio stream 100. The single-talker transcriptions 103A-C may be merged into merged transcription 104 based on the consistent time representation scheme. For example, the merged transcription 104 may include indications of words that were spoken by each of the talkers in the input audio stream 100 (e.g., Alice, Bob and Carol), indications of the times that those words were spoken, and indications of the identity of the talkers that spoke those words. In some examples, the identity of the talkers may be determined based on the single-talker transcription 103A-C from which the words are obtained. For example, it may be determined that words obtained from single-talker transcription 103A are spoken by Ann, that words obtained from single-talker transcription 103B are spoken by Bob, and that that words obtained from single-talker transcription 103C are spoken by Carol. Thus, an identity of a first talker of the plurality of talkers that spoke a first portion of speech in the multi-talker output transcription may be indicated in the multi-talker output transcription. The identity of the first talker may be indicated based on a first single-talker transcription of the plurality of single talker transcriptions from which the first portion of speech is obtained.

FIG. 7 is a flowchart illustrating an example cluster-based embedding vector derivation process that may be used in accordance with the present disclosure. Operations 710-718 may be included in a cluster-based embedding vector derivation process. In some examples, operations 710-718 of FIG. 7 may be included in a post-completion cluster-based embedding vector derivation process, such as described above with reference to FIG. 3. As described above, when included in a post-completion cluster-based embedding vector derivation process, operations 710-718 may be performed a single time on an entire input audio stream after input audio stream has been fully generated. In some other examples, operations 710-718 of FIG. 7 may be included in an in-progress cluster-based embedding vector derivation process, such as described above with reference to FIG. 4. As described above, when included in an in-progress cluster-based embedding vector derivation process, operations 710-718 may be performed in a running fashion during generation of the input audio stream and may be performed repeatedly on different portions of the input audio stream as the different portions are generated. For example, operations 710-718 may be performed initially within cluster-based EV derivation iteration 401 of FIG. 4 (on stream portion 400A) and then may be performed again within cluster-based EV derivation iteration 401 of FIG. 4 (on stream portion 400B).

At operation 710, at least part of the input audio stream is analyzed, using a talker-enumeration model, to estimate time-varying numbers of concurrent talkers within the input audio stream at a plurality of times. For example, as shown in FIG. 3, during the post-completion cluster-based embedding vector derivation, a talker-enumeration ML model 300 may analyze the input audio stream 100 in its entirety to estimate time-varying numbers of concurrent talkers within the input audio stream 100 at a plurality of times. Specifically, the talker-enumeration ML model 300 may estimate a quantity of talkers that are speaking within the input audio stream 100 at any given time. As also described above, for in-progress cluster-based EV derivation, different portions of the input audio stream (e.g., stream portion 400A, stream portion 400B, etc.) may be analyzed in a running fashion.

At operation 712, a plurality of single-talker segments of the input audio stream may be determined using the time-varying numbers of concurrent talkers. The plurality of single-talker segments of the input audio stream are segments in which there is only one talker. For example, as shown in FIG. 3, the time-varying numbers of concurrent talkers may be used to determine single-talker segments (STS's) 311-316 of the input audio stream 100. Each single-talker segment (STS) 311-316 is a segment of the input audio stream 100 in which there is only one talker.

At operation 714, a plurality of segment embedding vectors are derived. One or more segment embedding vectors of the plurality of segment embedding vectors may be derived for each single-talker segment of the plurality of single-talker segments. For example, as shown in FIG. 3, an embedding vectorization 310 may be performed on each STS 311-316 to derive segment embedding vectors (SEV's) 301-308. Each STS 311-316 includes at least one of the SEV's 301-308. In the example of FIG. 3, SEV's 301 and 302 are derived for STS 311, segment embedding vector (SEV) 303 is derived for STS 312, SEV's 304 and 305 are derived for STS 313, SEV 306 is derived for STS 314, SEV 307 is derived for STS 315, and SEV 308 is derived for STS 316. Each SEV 301-308 is an embedding vector that represents the audio characteristics of a person that is talking in a respective one of the STS's 311-316. For example, SEV's 301 and 302 may represent the audio characteristics of a person that is talking in STS 311. SEV 301 may be generated based on speech in a first half of STS 311, while SEV 302 may be generated based on speech in a second half of STS 312. Thus, although they may represent the speech of the same person, SEV 301 and SEV 302 may be slightly different from one another, as a person's speech characteristics (e.g., tone, pitch, volume/amplitude, speed of talking, etc.) may change slightly over time.

At operation 716, the plurality of segment embedding vectors are clustered into a plurality of embedding vector clusters. For example, as shown in FIG. 3, an embedding vector clustering algorithm 320 may be executed on the SEV's 301-308 to cluster the SEV's 301-308 into embedding vector clusters 330A, 330B and 330C. The embedding vector clustering algorithm 320 may cluster the SEV's 301-308 into the embedding vector clusters 330A-C based on the relative similarities between the SEV's 301-308. For example, SEV's 301, 302 and 306, which are clustered into embedding vector cluster 330A, may have greater similarity to each other than to any of the SEV's 303-305, 307 and 308, which are not included in the embedding vector cluster 330A. Similarly, SEV's 304, 305 and 307, which are clustered into embedding vector cluster 330B, may have greater similarity to each other than to any of the SEV's 301-303, 306 and 308, which are not included in the embedding vector cluster 330B. Additionally, SEV's 303 and 308, which are clustered into embedding vector cluster 330C, may have greater similarity to each other than to any of the SEV's 301-302 and 304-307, which are not included in the embedding vector cluster 330C.

Each embedding vector cluster 330A-C may correspond to a respective talker of the plurality of talkers. Specifically, embedding vector cluster 330A corresponds to Ann, embedding vector cluster 330B corresponds to Bob, and embedding vector cluster 330C corresponds to Carol. In this example, because there are three talkers in the input audio stream 100 (Ann, Bob and Carol), three embedding vector clusters 330A-C are formed. It is noted that, for cluster-based embedding vector derivation, the number of talkers in the input audio stream 100 (and the number of embedding vector clusters 330A-C that are formed via the clustering) are not known in advance. Rather, the number of talkers and embedding vector clusters 330A-C are instead determined based on the result of the clustering, such as based on the relative similarities between the SEV's 301-308.

At operation 718, a plurality of representative embedding vectors are derived for the plurality of embedding vector clusters, wherein the plurality of talker embedding vectors includes the plurality of representative embedding vectors. Each representative embedding vector of the plurality of representative embedding vectors may be derived for a respective embedding vector cluster of the plurality of embedding vector clusters. For example, as shown in FIG. 3, during representative embedding vector (REV) derivation 340, REV's 331A-C may be derived from the embedding vector clusters 330A-C. Specifically, REV 331A is derived from embedding vector cluster 330A, REV 331B is derived from embedding vector cluster 330B, and REV 331C is derived from embedding vector cluster 330C. REV 331A is an embedding vector that is representative of the SEV's 301, 302 and 306 within the embedding vector cluster 330A. For example, REV 331A may be the centroid, or may be generated based on the centroid, of SEV's 301, 302 and 306. REV 331B is an embedding vector that is representative of the SEV's 304, 305 and 307 within the embedding vector cluster 330B. For example, REV 331B may be the centroid, or may be generated based on the centroid, of SEV's 304, 305 and 307. REV 331C is an embedding vector that is representative of the SEV's 303 and 308 within the embedding vector cluster 330C. For example, REV 331C may be the centroid, or may be generated based on the centroid, of SEV's 303 and 308. The REV's 331A-C may then be used as TEV's 105A-C for the respective talkers. Specifically, REV 331A may be used as TEV 105A for Ann, REV 331B may be used as TEV 105B for Bob, and REV 331C may be used as TEV 105C for Carol.

It is noted that operations 710 and 712 of FIG. 7 relate to examples in which a talker enumeration ML model is executed (prior to embedding vectorization) to determine single-talker segments, and the embedding vectorization is performed only on the single-talker segments. However, as also described above, an alternative technique (e.g., described above with reference to FIG. 5) may optionally be employed in which it is not necessary to execute the talker enumeration ML model prior to embedding vectorization. As described above, in this alternative technique, the embedding vectors corresponding to single-talker segments are detected during the clustering process and are then discarded, meaning that they are not used to determine representative embedding vectors. Thus, for the alternative technique, operations 710 and 712 of FIG. 7 may be skipped. For this reason, operations 710 and 712 are illustrated in FIG. 7 using dashed lines instead of solid lines. Additionally, for the alternative technique, segment embedding vectors may be determined for the entire input audio stream (or portion thereof) and not only for single-talker segments. It is noted that the alternative technique of FIG. 5 may be employed for both post-completion cluster-based embedding vector derivation and, also, for in-progress cluster-based embedding vector derivation.

For the alternative technique of FIG. 5, the clustering performed at operation 716 may include discarding one or more of the plurality of segment embedding vectors corresponding to one or more multi-talker segments of the input audio stream, which are portions of the input audio stream in which multiple talkers are speaking simultaneously. As described above with reference to FIG. 5, a variety of techniques may be employed to detect that SEV's 504-506 correspond to portions of the input audio stream 500 in which multiple talkers (e.g., Ann and Bob) are speaking simultaneously. In some examples, the embedding vector clustering algorithm 520 may examine the temporal (time-based) relationships between SEV's 501-509. Specifically, the embedding vector clustering algorithm 520 may examine neighborhoods of SEV's, which include two or more adjacent SEV's in succession (or otherwise in close time proximity to one another), to determine the amount of similarity or correlation between the adjacent SEV's. For example, for scenarios in which only a single person is speaking in adjacent SEV's, it is expected that those adjacent SEV's will have a high degree of similarity to one another since they correspond to speech from the same person. By contrast, for scenarios in which multiple talkers are speaking simultaneously in adjacent SEV's, it is expected that those SEV's will not have a high degree of similarity since they correspond to speech from more than one person. In the example of FIG. 5, it may be determined that adjacent SEV's 501-503 have a high degree of similarity to one another and therefore correspond to the same person (Ann). Additionally, it may be determined that adjacent SEV's 507-509 also have a high degree of similarity to one another and therefore correspond to the same person (Bob). By contrast, it may be determined that adjacent SEV's 504-506 do not have a high degree of similarity to one another and therefore correspond to a portion of the input audio stream 500 in which multiple talkers (Ann and Bob) are speaking simultaneously. For the alternative technique, these time-based analysis techniques may be employed as part of operation 716 of FIG. 7. As also shown in FIG. 5, a representative embedding vector (REV) 531A is determined for embedding vector cluster 530A and is used as TEV 105A for Ann. Additionally, an REV 531B is determined for embedding vector cluster 530B and is used as TEV 105B for Bob. It is noted, however, that no REV is determined for discarded multi-talker group 535.

Figure 8:
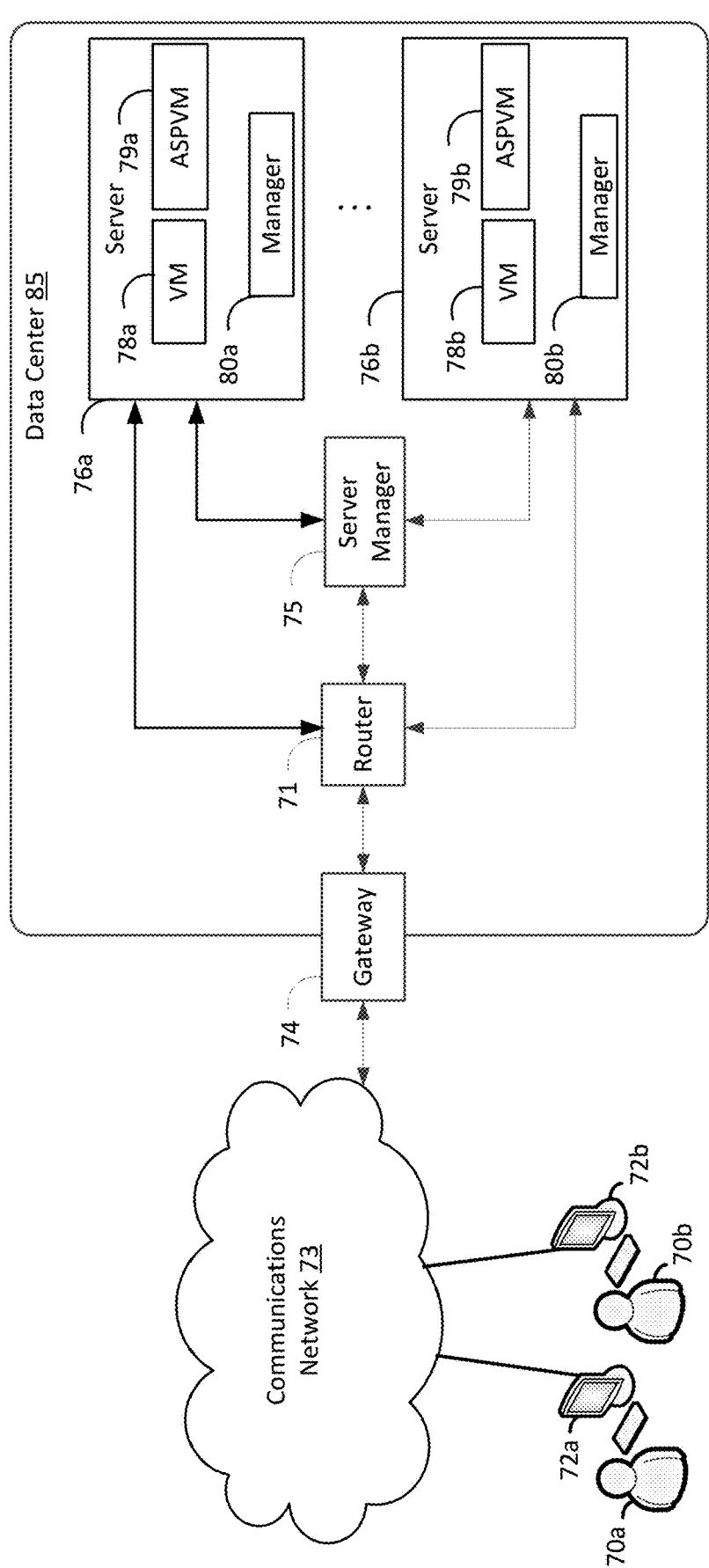
FIG. 8 is a diagram illustrating an example system for transmitting and providing data that may be used in accordance with the present disclosure.

An example system for transmitting and providing data will now be described in detail. In particular, FIG. 8 illustrates an example computing environment in which the embodiments described herein may be implemented. FIG. 8 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-b (which may be referred herein singularly as virtual machine instance 78 or in the plural as virtual machine instances 78). In this example, the resources also include audio stream processing virtual machines (ASPVM's) 79a-b, which are virtual machines that are configured to execute any, or all, of the multi-talker audio stream separation, transcription and diarization techniques described above.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 8, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 8 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 8, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 8, a server manager 75 is also employed to at least in part direct various communications to, from and/or between servers 76a and 76b. While FIG. 8 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 85 described in FIG. 8 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 9:
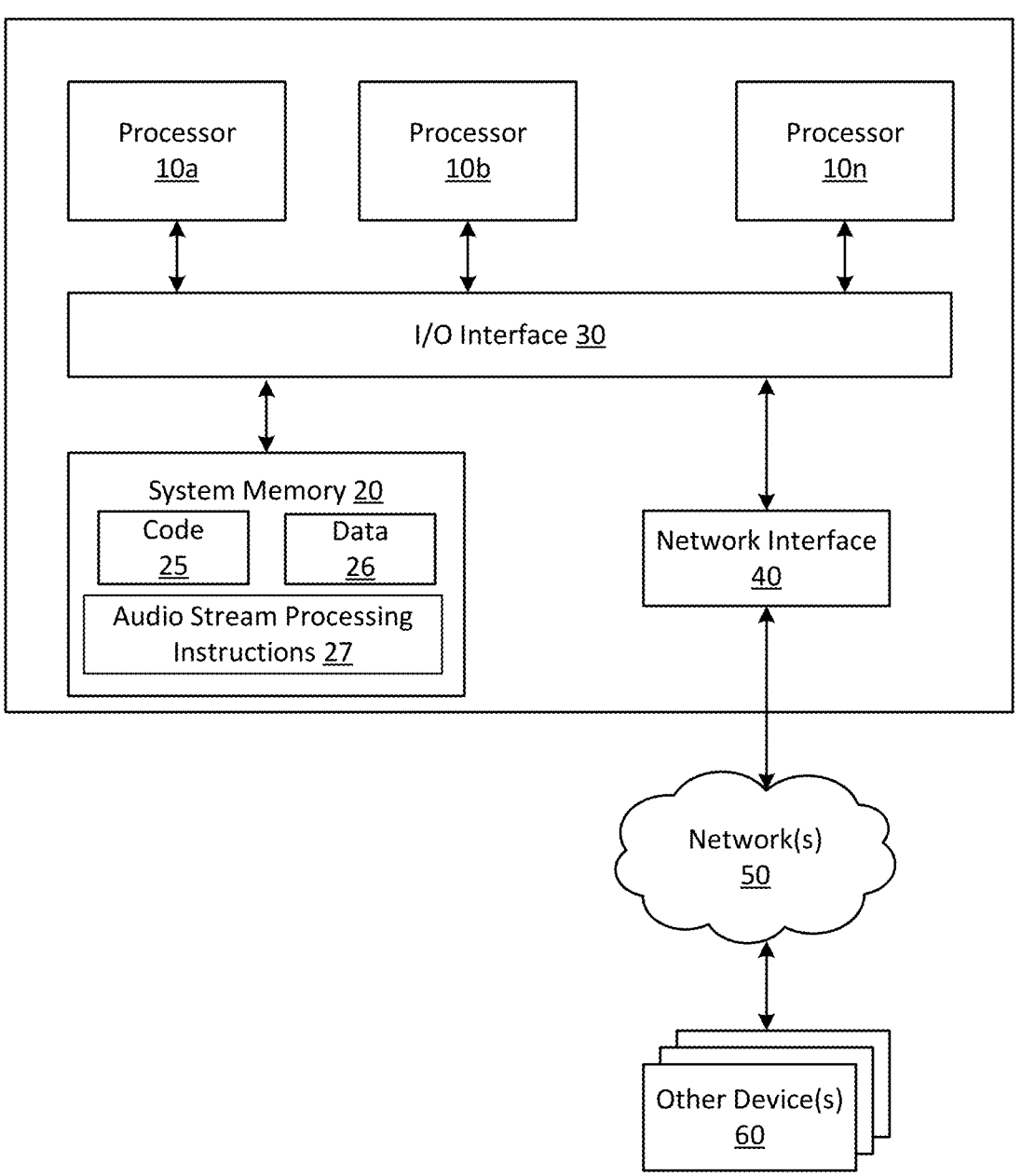
FIG. 9 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 9 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26. Additionally, in this example, system memory 20 includes audio stream processing instructions 27, which are instructions for executing any, or all, of the multi-talker audio stream separation, transcription and diarization techniques described above.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability container of a resource instance is intended to be independent of the availability container of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
one or more processors; and
one or more memories having stored therein instructions that, upon execution by the one or more processors, cause the computing system to perform computing operations comprising:

deriving a plurality of talker embedding vectors corresponding to a plurality of talkers in an input audio stream, wherein each talker embedding vector of the plurality of talker embedding vectors corresponds to a respective talker of the plurality of talkers and represents respective voice characteristics of the respective talker, wherein the deriving of the plurality of talker embedding vectors comprises performing a cluster-based embedding vector derivation that is performed in a plurality of iterations corresponding to different portions of the input audio stream including deriving, during generation of the input audio stream, a first embedding vector and a second embedding vector both for a first talker of the plurality of talkers, wherein the first embedding vector is based only on a first portion of the input audio stream, wherein the second embedding vector is based on the first portion and a second portion of the input audio stream;

executing, on the input audio stream, a plurality of instances of a personalized noise suppression model, wherein each instance of the plurality of instances of the personalized noise suppression model employs a respective talker embedding vector of the plurality of talker embedding vectors;

generating, by the plurality of instances of the personalized noise suppression model, a plurality of single-talker audio streams corresponding to the input audio stream, wherein each single-talker audio stream of the plurality of single-talker audio streams is generated by a respective instance of the plurality of instances of the personalized noise suppression model by outputting only sounds, from the input audio stream, that correspond to the respective talker embedding vector, and wherein the plurality of single-talker audio streams are generated using a consistent time representation scheme that is consistent across the plurality of single-talker audio streams;

generating, based on the plurality of single-talker audio streams, a plurality of single-talker transcriptions, wherein each single-talker transcription of the plurality of single-talker transcriptions is generated based on a respective single-talker audio stream of the plurality of single-talker audio streams; and merging, based on the consistent time representation scheme, the plurality of single-talker transcriptions into a multi-talker output transcription corresponding to the plurality of talkers.

2. The computing system of claim 1, wherein the performing of the cluster-based embedding vector derivation comprises:

analyzing, using a talker-enumeration model, at least part of the input audio stream to estimate time-varying numbers of concurrent talkers within the input audio stream at a plurality of times;

determining, using the time-varying numbers of concurrent talkers, a plurality of single-talker segments of the input audio stream in which there is only one talker;

deriving a plurality of segment embedding vectors, wherein one or more segment embedding vectors of the plurality of segment embedding vectors are derived for each single-talker segment of the plurality of single-talker segments;

clustering the plurality of segment embedding vectors into a plurality of embedding vector clusters; and deriving a plurality of representative embedding vectors for the plurality of embedding vector clusters, wherein each representative embedding vector of the plurality of representative embedding vectors is derived for a respective embedding vector cluster of the plurality of embedding vector clusters, and wherein the plurality of talker embedding vectors includes the plurality of representative embedding vectors.

3. The computing system of claim 1, wherein the performing of the cluster-based embedding vector derivation comprises:

deriving a plurality of segment embedding vectors;

clustering the plurality of segment embedding vectors into a plurality of embedding vector clusters, wherein the clustering comprises discarding one or more of the plurality of segment embedding vectors corresponding to one or more multi-talker segments of the input audio stream; and deriving a plurality of representative embedding vectors for the plurality of embedding vector clusters, wherein each representative embedding vector of the plurality of representative embedding vectors is derived for a respective embedding vector cluster of the plurality of embedding vector clusters, and wherein the plurality of talker embedding vectors includes the plurality of representative embedding vectors.

4. The computing system of claim 1, wherein the operations further comprise:

indicating, in the multi-talker output transcription, an identity of the first talker of the plurality of talkers that spoke a first portion of speech in the multi-talker output transcription, wherein the identity of the first talker is indicated based on a first single-talker transcription of the plurality of single-talker transcriptions from which the first portion of speech is obtained.

5. A computer-implemented method comprising:

deriving a plurality of talker embedding vectors corresponding to a plurality of talkers in an input audio stream, wherein each talker embedding vector of the plurality of talker embedding vectors corresponds to a respective talker of the plurality of talkers and represents respective voice characteristics of the respective talker, wherein the deriving of the plurality of talker embedding vectors comprises performing a cluster-based embedding vector derivation that is performed in a plurality of iterations corresponding to different portions of the input audio stream including deriving, during generation of the input audio stream, a first embedding vector and a second embedding vector both for a first talker of the plurality of talkers, wherein the first embedding vector is based only on a first portion of the input audio stream, wherein the second embedding vector is based on the first portion and a second portion of the input audio stream;

executing, on the input audio stream, a plurality of instances of a personalized noise suppression model, wherein each instance of the plurality of instances of the personalized noise suppression model employs a respective talker embedding vector of the plurality of talker embedding vectors;

generating, by the plurality of instances of the personalized noise suppression model, a plurality of single-talker audio streams corresponding to the input audio stream, wherein each single-talker audio stream of the plurality of single-talker audio streams is generated by a respective instance of the plurality of instances of the personalized noise suppression model by outputting only sounds, from the input audio stream, that correspond to the respective talker embedding vector;

generating, based on the plurality of single-talker audio streams, a plurality of single-talker transcriptions, wherein each single-talker transcription of the plurality of single-talker transcriptions is generated based on a respective single-talker audio stream of the plurality of single-talker audio streams; and merging the plurality of single-talker transcriptions into a multi-talker output transcription corresponding to the plurality of talkers.

6. The computer-implemented method of claim 5, wherein the performing of the cluster-based embedding vector derivation comprises:

analyzing, using a talker-enumeration model, at least part of the input audio stream to estimate time-varying numbers of concurrent talkers within the input audio stream at a plurality of times;

determining, using the time-varying numbers of concurrent talkers, a plurality of single-talker segments of the input audio stream in which there is only one talker;

deriving a plurality of segment embedding vectors, wherein one or more segment embedding vectors of the plurality of segment embedding vectors are derived for each single-talker segment of the plurality of single-talker segments;

clustering the plurality of segment embedding vectors into a plurality of embedding vector clusters; and deriving a plurality of representative embedding vectors for the plurality of embedding vector clusters, wherein each representative embedding vector of the plurality of representative embedding vectors is derived for a respective embedding vector cluster of the plurality of embedding vector clusters, and wherein the plurality of talker embedding vectors includes the plurality of representative embedding vectors.

7. The computer-implemented method of claim 5, wherein the performing of the cluster-based embedding vector derivation comprises:

deriving a plurality of segment embedding vectors;

clustering the plurality of segment embedding vectors into a plurality of embedding vector clusters, wherein the clustering comprises discarding one or more of the plurality of segment embedding vectors corresponding to one or more multi-talker segments of the input audio stream; and deriving a plurality of representative embedding vectors for the plurality of embedding vector clusters, wherein each representative embedding vector of the plurality of representative embedding vectors is derived for a respective embedding vector cluster of the plurality of embedding vector clusters, and wherein the plurality of talker embedding vectors includes the plurality of representative embedding vectors.

8. The computer-implemented method of claim 5, wherein the plurality of single-talker audio streams are generated using a consistent time representation scheme that is consistent across the plurality of single-talker audio streams.

9. The computer-implemented method of claim 8, wherein the merging the plurality of single-talker transcriptions into a multi-talker output transcription is performed based on the consistent time representation scheme.

10. The computer-implemented method of claim 5, further comprising:

indicating, in the multi-talker output transcription, an identity of the first talker of the plurality of talkers that spoke a first portion of speech in the multi-talker output transcription, wherein the identity of the first talker is indicated based on a first single-talker transcription of the plurality of single-talker transcriptions from which the first portion of speech is obtained.

11. One or more non-transitory computer-readable storage media having stored thereon computing instructions that, upon execution by one or more computing devices, cause the one or more computing devices to perform computing operations comprising:

deriving a plurality of talker embedding vectors corresponding to a plurality of talkers in an input audio stream, wherein each talker embedding vector of the plurality of talker embedding vectors corresponds to a respective talker of the plurality of talkers and represents respective voice characteristics of the respective talker, wherein the deriving of the plurality of talker embedding vectors comprises performing a cluster-based embedding vector derivation that is performed in a plurality of iterations corresponding to different portions of the input audio stream including deriving, during generation of the input audio stream, a first embedding vector and a second embedding vector both for a first talker of the plurality of talkers, wherein the first embedding vector is based only on a first portion of the input audio stream, wherein the second embedding vector is based on the first portion and a second portion of the input audio stream;

executing, on the input audio stream, a plurality of instances of a personalized noise suppression model, wherein each instance of the plurality of instances of the personalized noise suppression model employs a respective talker embedding vector of the plurality of talker embedding vectors;

generating, by the plurality of instances of the personalized noise suppression model, a plurality of single-talker audio streams corresponding to the input audio stream, wherein each single-talker audio stream of the plurality of single-talker audio streams is generated by a respective instance of the plurality of instances of the personalized noise suppression model by outputting only sounds, from the input audio stream, that correspond to the respective talker embedding vector;

generating, based on the plurality of single-talker audio streams, a plurality of single-talker transcriptions, wherein each single-talker transcription of the plurality of single-talker transcriptions is generated based on a respective single-talker audio stream of the plurality of single-talker audio streams; and merging the plurality of single-talker transcriptions into a multi-talker output transcription corresponding to the plurality of talkers.

12. The one or more non-transitory computer-readable storage media of claim 11, wherein the performing of the cluster-based embedding vector derivation comprises:

analyzing, using a talker-enumeration model, at least part of the input audio stream to estimate time-varying numbers of concurrent talkers within the input audio stream at a plurality of times;

determining, using the time-varying numbers of concurrent talkers, a plurality of single-talker segments of the input audio stream in which there is only one talker;

deriving a plurality of segment embedding vectors, wherein one or more segment embedding vectors of the plurality of segment embedding vectors are derived for each single-talker segment of the plurality of single-talker segments;

clustering the plurality of segment embedding vectors into a plurality of embedding vector clusters; and deriving a plurality of representative embedding vectors for the plurality of embedding vector clusters, wherein each representative embedding vector of the plurality of representative embedding vectors is derived for a respective embedding vector cluster of the plurality of embedding vector clusters, and wherein the plurality of talker embedding vectors includes the plurality of representative embedding vectors.

13. The one or more non-transitory computer-readable storage media of claim 11, wherein the performing of the cluster-based embedding vector derivation comprises:

deriving a plurality of segment embedding vectors;

clustering the plurality of segment embedding vectors into a plurality of embedding vector clusters, wherein the clustering comprises discarding one or more of the plurality of segment embedding vectors corresponding to one or more multi-talker segments of the input audio stream; and deriving a plurality of representative embedding vectors for the plurality of embedding vector clusters, wherein each representative embedding vector of the plurality of representative embedding vectors is derived for a respective embedding vector cluster of the plurality of embedding vector clusters, and wherein the plurality of talker embedding vectors includes the plurality of representative embedding vectors.

14. The one or more non-transitory computer-readable storage media of claim 11, wherein the plurality of single-talker audio streams are generated using a consistent time representation scheme that is consistent across the plurality of single-talker audio streams.

15. The one or more non-transitory computer-readable storage media of claim 14, wherein the merging the plurality of single-talker transcriptions into a multi-talker output transcription is performed based on the consistent time representation scheme.

16. The one or more non-transitory computer-readable storage media of claim 11, wherein the operations further comprise:

indicating, in the multi-talker output transcription, an identity of the first talker of the plurality of talkers that spoke a first portion of speech in the multi-talker output transcription, wherein the identity of the first talker is indicated based on a first single-talker transcription of the plurality of single-talker transcriptions from which the first portion of speech is obtained.

* * * * *